Nov. 25, 1941.        W. O. LYTLE        2,264,245
APPARATUS FOR MAKING GLASS SHEETS
Filed June 5, 1938

INVENTOR.
WILLIAM O. LYTLE
BY Bradley + Bee
ATTORNEYS.

Patented Nov. 25, 1941

2,264,245

UNITED STATES PATENT OFFICE 2,264,245

APPARATUS FOR MAKING GLASS SHEETS

William O. Lytle, New Kensington, Pa., assignor to Pittsburgh Plate Glass Company, Allegheny County, Pa., a corporation of Pennsylvania Application July 5, 1938, Serial No. 217,427

4 Claims. (Cl. 49—3)

Figure 1:
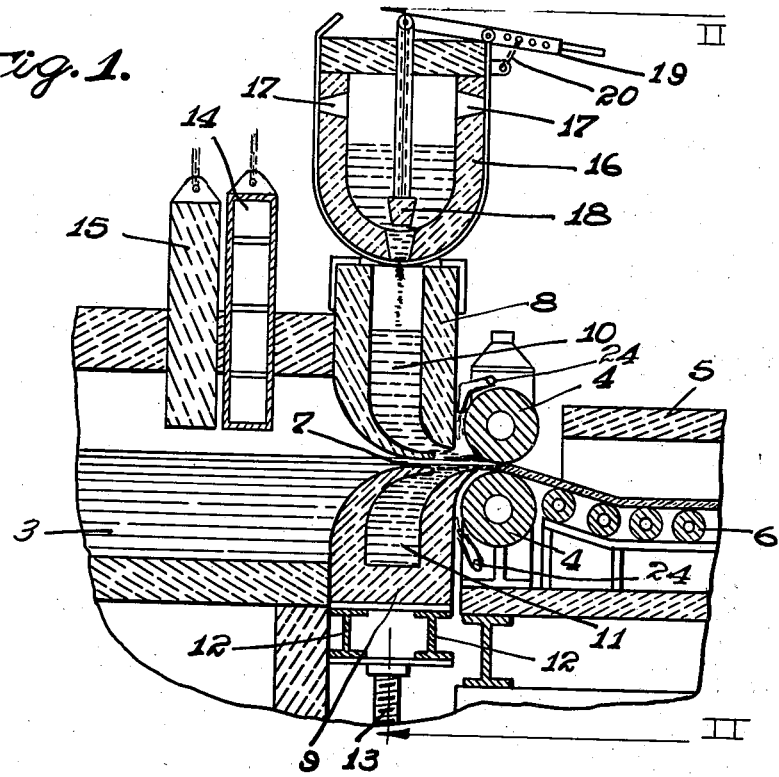
Figure 2:
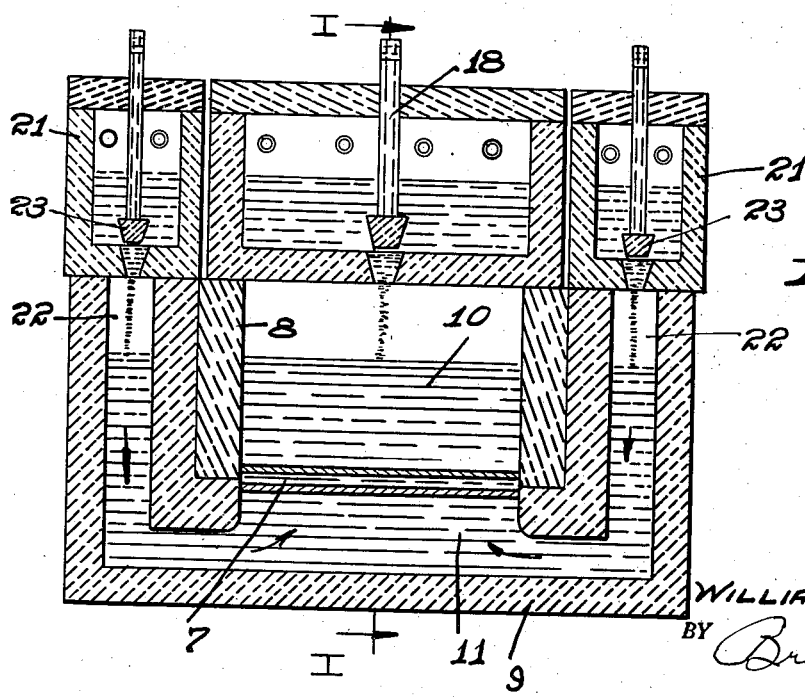

The invention relates to apparatus for producing a glass sheet continuously having one or both surfaces provided with a layer of glass of a different composition, such as a colored glass. The invention has for its principal objects the provision of apparatus of the character specified which can be operated without contaminating the main body of glass in the melting tank, so that production may be shifted from ordinary plate glass to glass of any desired color and back again on a standard tank equipment of the Gelstharp or similar type without much loss of time and at a low cost. A further object is the provision of apparatus of the character specified which can be utilized to produce a clear glass sheet having a colored glass layer on one or both sides of substantial density suitable for glass shingles without grinding or polishing or capable of being ground and polished in the same manner as ordinary plate glass. One form of the apparatus is shown in the accompanying drawing, wherein:

Figure 1 is a longitudinal section through the apparatus on the line I—I of Fig. 2; and Fig. 2 is a section on the line II—II of Fig. 1.

Referring to the drawing, 3 is the outlet end of a glass melting tank preferably of the regenerator type. 4, 4 are water cooled driven sizing rolls for forming the sheet, and 5 is the end of the roller leer provided with the usual rolls 6 for carrying the glass sheet therethrough. The end wall of the tank is provided with an outlet slot 7 and is in the form of a pair of containers 8 and 9 of refractory material adapted to carry the bodies 10 and 11 of a glass composition different from that of the tank, such as colored glass. The end wall as thus constituted is supported upon a pair of I beams 12 forming a base and adjustable vertically by means of the screws 13 to regulate the vertical height of the outlet slot 7. This portion of the structure is adapted to be moved into and out of position by an overhead crane, not shown, and when it is desired to proceed with the manufacture of ordinary plate glass, the end wall structure is removed and an end wall of ordinary construction having a slot therethrough is substituted. In order to make this substitution, it is necessary to cut off the supply of glass to the slot 7 and for this purpose, the water-cooled gate 14 is provided, such gate being supported above for vertical movement, so that it can be lowered into the glass to the bottom thereof when it is desired to cut off the supply of glass. A second gate 15 of refractory material is similarly mounted for vertical movement in front of the gate 15, the purpose of this gate being to shield the gate 14 and thus reduce the chilling action of the gate 14 upon the glass in the main body of the tank during the normal operation of the apparatus when the parts are in the position shown.

The container 10 is supplied with molten glass from a small tank 16, which is suitably supported for movement to and from the position shown. The tank is supplied with openings 17 through which burners may be inserted for keeping the body of glass at the proper temperature. The flow from the tank 16 is governed by means of the gate 18 operated by the handle 19 and held in open position by means of the latch 20. This arrangement provides a means for supplying a layer of colored glass to the surface of the layer flowing through the slot 7, and the application of this colored glass is at a point where it will not work back into the main body of the tank and thus contaminate this body of glass. This is necessarily the case, as the entire body of the glass in the slot 7 is moving forward so that there is no opportunity for the colored glass to be carried to the rear.

Provision is also made for supplying a layer of colored glass from the container 9 to the bottom of the layer passing through the slot 7. This container 9 is supplied with glass from the two small tanks 21, 21 shown in Fig. 2 which discharge into the vertical passageways 22, 22 at the ends of the container 9. The flow of glass to these passageways is controlled by means of the gates 23, 23 which are operated in the same manner as the gate 18 heretofore described. Here again, since the discharge of colored glass is to the layer flowing forwardly through the slot 7, there is no opportunity of the glass to be distributed to the rear into the main body of glass in the tank and thus contaminate such glass.

In order to fill the containers 8 and 9 at the beginning of the operation, the outlets from the two containers and the slot 7 are closed by means of a clay slab, the rolls 4, 4 being at this time widely separated. After the water-cooled gate 14 has been raised and the glass in the forward end of the tank is brought up to the proper temperature for forming the sheet, the clay slab is removed from the slot 7 and the flow therethrough of clear and colored glass is permitted to start between the sizing rolls, a certain amount of waste glass being allowed to flow out through the widely separated rolls before the rolls are adjusted toward each other to produce the glass sheet having the desired thickness. The thickness of the layers of colored glass which are supplied to the main body of the sheet is regulated by the level at which the glass is maintained in the container 8 and in the passageways 22 (Fig. 2), the level being raised when a thick layer is desired and lowered when it is desired to thin the colored layers. This flow may also be regulated by the temperature at which the glass is supplied to the containers 8 and 9 and by varying the composition of the glass. The sheet which passes the sizing rolls has a relatively rough surface due to the marring effect of the rolls, and if desired, the glass may be utilized in this condition for shingles and certain types of tile in which a relatively rough low reflective surface is preferable. In those cases in which a polished surface is desired, the glass may be ground and polished in the usual manner either upon one or both faces depending upon requirements or by a subsequent flash heat treatment to give a fire polish. The invention contemplates applying the colored coating not only to both sides, but to one side only, either from the container 8 alone, or from the container 9 alone, as in some instances it is desirable to produce glass having only one surface colored. If the colored glass is applied only from the lower container 11, the upper container 8 may be raised so that its lower end is out of contact with the bath, and the upper sizing roll also raised, so that no marring of the upper surface of the sheet occurs. Under these conditions a fire finished upper surface is secured on the sheet. It is further possible to utilize the process and apparatus in applying layers which are not of colored glass, but which are of different composition in order to secure certain physical effects. For instance, one or both of the surfaces may be coated with heat absorbing glass, or they may be coated with a layer of glass which will not effloresce (e. g. glass which will not "bloom" and which is highly resistant to surface deterioration under exposure to various atmospheric conditions) under the action of moist atmosphere, such glass being desirable in certain locations, such as in double glazing, as is well known in the art. In some cases it may be of advantage to apply cooling means to the glass before it enters the sizing rolls in order to stiffen the surfaces and prevent too much mixing of the colored layers with the base glass. This may be accomplished in various ways, such as by the use of the nozzles 24 supplying air under pressure. Depending on the character of the cooling treatment, this expedient may be applied to give the colored layer an ornamental crackled appearance.

The batch for producing the body of glass in the main tank is preferably the standard plate glass batch, so that when the coloring operation is discontinued, the production of the tank may be switched back to the production of ordinary plate glass, the arrangement as shown and described for shifting the end walls, permitting of this procedure with the loss of only a few hours time. The glass in the containers 8 and 9 may be colored by any of the well known coloring agents, such as cobalt oxide for blue glass, chromium or ferrous silicates for green glass, and iron and manganese silicates for amber glass. The batch in other respects preferably closely approximates that in the melting tank so that the co-efficient of expansion of the layers of colored glass is substantially the same as that of the main body of the sheet, thus preventing any tendency of the colored layers to crack away from the main body of the sheet. After the formation of the colored layers and the cooling of the sheet, decorative effects may be obtained by etching or sand blasting an ornamental design in either surface of the sheet.

What I claim is:

1. In an apparatus for making glass continuously, a glass melting tank including upper and lower spaced wall members having opposed horizontal lips defining a laterally opening horizontal outlet slot for discharging glass from a molten body adapted to flow horizontally from the tank, one of said members including a chamber normally having molten glass therein, said chamber having an outlet feeding into the horizontal slot, a pair of driven horizontal rolls arranged one above the other adjacent the slot to receive and draw therebetween a sheet of molten glass from the outlet slot.

2. In an apparatus for making glass continuously, a glass melting tank including upper and lower spaced wall members having opposed horizontal lips defining a laterally opening horizontal outlet slot for discharging sheet glass from a molten body adapted to flow horizontally from the tank, the lower lip extending laterally from the tank wall in offset relation to the upper lip, one of said members including a chamber normally having molten glass therein, said chamber having an outlet leading into the horizontal slot, a pair of driven horizontal rolls arranged one above the other adjacent the slot to receive and draw therebetween a sheet of molten glass from the outlet slot.

3. In a glass sheet forming apparatus, a plurality of containers for supplying molten glass of different characteristics, glass feeding means including a plurality of parallel horizontal slots in the containers and merging into a common horizontal discharge outlet from which a horizontal sheet of composite glass is adapted to be withdrawn, and a pair of driven horizontal rolls disposed in opposed relation to the common outlet for drawing the composite glass sheet horizontally therefrom.

4. In a glass sheet forming apparatus, a plurality of containers for supplying molten glass of different characteristics, glass feeding means including a plurality of parallel horizontal slots in the containers and merging into a common horizontal discharge outlet from which a horizontal sheet of composite glass is adapted to be withdrawn and a pair of driven horizontal rolls disposed in opposed relation to the common outlet for drawing the composite glass sheet horizontally therefrom, and cooling means directed between the common outlet and the pair of rolls for supplying cooling medium upon the glass sheet before it reaches the rolls.

WILLIAM O. LYTLE.